United States Patent [19]

Pratt et al.

[11] 4,251,630

[45] Feb. 17, 1981

[54] PREPARATION OF MALT HIGH IN ALPHA-1,6-HYDROLASE

[75] Inventors: George W. Pratt, Milwaukee, Wis.; Thomas W. Chapple, Sierra Madre, Calif.; Michael J. Fahy, Golden, Colo.

[73] Assignee: Kurth Malting Corporation, Milwaukee, Wis.

[21] Appl. No.: 928,812

[22] Filed: Jul. 28, 1978

[51] Int. Cl.³ .................. C12P 19/16; C12P 19/12; A23L 1/202; C12C 1/04

[52] U.S. Cl. .................................... 435/98; 426/16; 426/29; 426/64; 435/93; 435/99; 435/100; 435/185

[58] Field of Search .................. 426/11, 16, 29, 64; 435/93, 185, 100, 98, 99

[56] References Cited

U.S. PATENT DOCUMENTS 3,908,021  9/1975  Rehberger et al. .................. 426/16

OTHER PUBLICATIONS

DeClerck J. A. Textbook of Brewing, vol. one Chapman & Hall Ltd., London 1957, (pp. 140-156 and 181-187).

Radley, J. A., Starch and Its Derivatives, vol. 2, 3rd ed. Chapman & Hall Ltd. London, 1953, (pp. 78-80).

*Primary Examiner*—David M. Naff
*Attorney, Agent, or Firm*—Merriam, Marshall & Bicknell

[57] ABSTRACT

Malt having a high content of alpha-1,6-hydrolase activity is prepared by germinating previously steeped barely until the average acrospire reaches a length of at least 1¼ times the average length of the kernals and it contains at least 55 units of alpha-1,6-hydrolase activity per gram of malt. The malt provides more complete hydrolyzing of starch to glucose and maltose, and it is useful in producing low carbohydrate beer, in producing distilled alcoholic beverages and in producing maltose syrup.

4 Claims, No Drawings

PREPARATION OF MALT HIGH IN ALPHA-1,6-HYDROLASE

This invention relates to malting processes, the conversion of starch to maltose by malt and the production of low calorie beer. More particularly, this invention is concerned with a novel malting process which yields a novel malt high in alpha-1,6-hydrolase. The high alpha-1,6-hydrolase content of the malt makes it useful in converting starch to high maltose syrups and in the production of low calorie beer by attacking 1,6-linkages in starch and starch degradation products, such as dextrins.

It is well known that cereal grains such as barley, rye, oats and wheat can be germinated, i.e., malted, to modify the kernel structure, composition and enzyme content. The resulting malts have many important uses in foods for animals and humans. Most important of all, however, is malted barley which is a basic material used in the brewing and distilling industries, and in the saccharification of starch.

The production of malt from barley can be considered as consisting of four main steps.

The first step is to store the barley. Freshly harvested barley does not germinate well. It must go through a period of rest and sweating (the giving off of water vapor and carbon dioxide) before it reaches good germinating energy and capacity. About 30 to 60 days storage after harvest is sufficient to condition barley for germination.

The second main step is to "steep" the barley kernels in water, which may or may not be aerated. During steeping, respiration of the kernels becomes noticeable and heat and gases are given off although no significant growth takes places. The barley kernels are steeped from two to three days in water at about 10°–16° C. (50°–60° F.) to ensure penetration of water into the barley, and generally until a moisture content of approximately 35–45% is reached. This is usually done in several stages and advisably designated as first, second and third steeps. When the steeping is completed, the white tips of the barley rootlets should not be more than just appearing ("chitting").

The third main step is the germination of the barley kernels. Germination broadly involves subjecting the steeped barley to appropriate conditions of temperature, moisture and oxygen supply for a time sufficient for the interior portion of the barley kernel (the endosperm mass) to be made porous and growth of the embryo facilitated. Growth starts slowly at the embryo end of the kernel the first day, with growth being accelerated the second day which is usually when additional water is applied to the germinating grain. The barley kernel continues to "chit" at the base of the kernel by showing a white tip and rootlets then grow outwardly from the tip. The acrospire also starts to grow from the base of the kernel and grows under the hull toward the top end of the kernel. The kernels during growth give off considerable heat and carbon dioxide which are removed from the grain by air currents. Air entering the germinating compartment is usually approximately at 11°–16° C. (52°–60° F.) to maintain the germinating grain between 16°–21° C. (60°–70° F.). Water is added during germination to prevent excessive drying but not necessarily always to prevent some moisture loss. It is often advantageous to allow some drying during germination to decrease the amount of moisture removal in kilning. When the acrospire has grown from three-quarters of the length, to the full length, of the kernel, the enzymes and the enzymatic system in the barley usually have been developed and conditioned so that it will subsequently function as malt to (a) convert starches to dextrins and sugars, (b) convert insoluble proteins to soluble proteins during mashing operations in a brewery or distillery, and (c) provide a source of desirable taste and aroma which carries through into the finished product, such as beer. See U.S. Pat. Nos. 3,759,792; 3,293,144; and 3,085,945.

In the fourth step, the germinated green malt is kilned to reduce its moisture content and to stop further growth. Brewer's malt is obtained, for example, by drying the green malt at 120° F.–130° F. for 20 hours to bring the malt moisture to about 5–10%, and then at 170°–200° F. for about 4 hours to 4% moisture (U.S. Pat. Nos. 3,759,792 and 3,085,945). The dried malt is cleaned and stored. Cleaning usually removes the rootlets, loose hulls and broken kernels.

Malt has long been known to provide enzymes for the hydrolysis of starch. Starch is a polymer of glucose containing glucose units, principally in an alpha-1,4-linkage but also containing branch points consisting of an alpha-1,6-linkage. The principal enzymes from malt are alpha-amylase and beta-amylase and both are known to attack the alpha-1,4-linkage. Alpha-amylase acts in a random manner on the starch polymer whereas beta-amylase removes a molecule of maltose from the non-reducing terminal of the polymer. However, neither of these enzymes is capable of hydrolyzing the alpha-1,6-linked branch points. While similar enzymes have been known in malt, such as limit dextrinase, R-enzyme, and pullulanase, which will attack the 1,6-linkage, the enzyme level has been so low the breakdown of starch by malt enzymes into its simpler sugars has always been substantially incomplete. Only a partial breakdown, producing glucose, maltose and higher molecular weight dextrins containing the resistant alpha-1,6-linkages, is realized.

Malt is traditionally used by the brewing industry for the manufacture of beer. The ground malt is extracted by a process designed to break the starch present in the malt and any starchy adjunct present into sugars, mainly maltose. Normal or conventional commercial malts usually have insufficient enzymatic activity to convert starch used in a typical brewer's work to greater than 41% maltose (*Malting and Brewing Science*, Hough, Briggs and Stevens; Chapman and Hall, Ltd., London, 1971, p. 203). Most of the sugars in this wort are fermented by yeast to carbon dioxide and alcohol. The breakdown of starch is incomplete, leaving behind small polymers of glucose known as dextrins. These dextrins serve as a source of carbohydrate when the beer is ingested.

A beer in which this carbohydrate fraction is reduced is desirable. Such a process is described in U.S. Pat. No. 3,379,534 by Gablinger and teaches the addition of amyloglucosidase enzyme. Not only does amyloglusosidase enzyme convert starch to glucose but amyloglucosidase also reduces the dextrin content. However, the glucose sugar formed by the amyloglucosidase enzyme is believed by many to effect a slight change in yeast metabolism. This in turn causes an undesirable change in the flavor away from that of traditional beer.

It is known that green malt contains enzymatic activity which allows greater production of maltose from starch compared to kilned malt. See *Starch and Its De-*

*rivatives* by J. A. Radley, 3rd edition, Volume 2, pg. 78, John Wiley and Sons, N.Y. for a reported commercial procedure using green malt to produce a maltose content of 80%. Green malt, however, is not storable or transportable and thus is not a product readily usable commercially. Normal kilned malts have inadequate enzymatic activity to produce from starch maltose syrups having more than 41% maltose (U.S. Pat. No. 3,868,464).

Heady and Armbruster U.S. Pat. No. 3,565,765 and Hurst and Turner Canadian Pat. No. 986,045 teach the preparation of high maltose syrups from starch by use of a mixture of beta-amylase or maltogenic enzymes and pullulanase. The processes of both patents teach using malt or extracted malt enzymes supplemented with pullulanase to produce high maltose (60–77%) syrups.

U.S. Pat. No. 3,988,696 teaches the use of a streptomyces amylase in conjunction with beta-amylase for the production of maltose (62–83%) from starch.

U.S. Pat. No. 3,996,107 teaches the use of a mixture of alpha-1,6 glucosidase and alpha-1,4-glucosidase immobilized onto a matrix of a copolymer of acrylamide and acrylic acid for producing maltose (60–70%) from starch.

Maltose production employing only nonfood-source enzymes, such as those formed by bacterial and fungal systems, introduces increased costs and flavors sometimes found undesirable or unacceptable in foods, beer and maltose syrups. These is also the added problem of viable organism carryover from the enzyme production into the product subsequently hydrolyzed by the enzyme, whether it be in beer fermentation or maltose production.

According to the present invention there is provided novel malt which has higher alpha-1,6-hydrolase, both as green malt, partially dried malt and fully kilned malt, than previously produced malts. Whether the malt of the invention is in the form of green malt, partially dried malt or fully dried or kilned malt it has at least 55, and generally at least 60, units of alpha-1,6-hydrolase per one gram of malt.

One unit of alpha-1,6-hydrolase is defined as equal to 1 mg of maltose equivalent produced by one gram of malt from a 0.5% pullulan substrate in 60 minutes at 50° C. and pH 5.

The novel green malt which is obtained from the subsequently described germination step will generally contain a minimum of 75 units of alpha-1,6-hydrolase per one gram of malt. Conventional brewer's green malt usually has no more than 17, while distiller's green malt has about 44 units of alpha-1,6-hydrolase per one gram of malt. The novel green malt as obtained from the germination step can have from about 20–85% water by weight. It is thus a product not suitable for shipping. However, the novel green malt can be used immediately, without drying, in the production of malt syrup of high alpha-1,6-hydrolase which can then be used in the production of maltose or in brewing and in distilleries.

It has been further found that the alpha-1,6-hydrolase activity of the green malt increases substantially as it is subjected to comparatively low temperature slow drying conditions. The alpha-1,6-hydrolase activity, for example, can rise from about 75 units for green undried malt to 90 units and higher for partially dried malt having a water content of about 50 to 85%. The rise in enzyme activity is generally effected within the first twenty-four hours of drying. The resulting partially dried malt can also be used to make malt syrup, by brewers and in distilleries. The stability of the product will depend on its moisture content. Partially dried high moisture malt would need to be used very soon after production while a nearly dried malt could be transported and stored a short time.

As drying of the malt continues until a fully dried malt having about 4 to 10% moisture is obtained, the alpha-1,6-hydrolase decreases. The novel fully dried or kilned malt has a minimum of 55, and generally 60, units of alpha-1,6-hydrolase per one gram of malt compared to previous maximum values of about 17 units for brewer's malt, 28 units for distiller's malt and 48 units for distiller's malt treated with gibberellic acid.

Because of its high level of alpha-1,6-hydrolase, this novel malt, as geen malt, partially dried malt and fully kilned malt, is called enzyme malt. The malt may be further characterized as generally having an acrospire length of from about 1¼ to 3 or more times the average kernel length. This ratio is generally applicable whether the basis for the measurement is green malt, partially dried malt or fully dried malt since drying green malt results in shrinkage of the kernel and the acrospire on a reasonably proportionate basis. The acrospire length is a visible indication as to the state of the modification of the kernel and of alpha-1,6-hydrolase development. The dry enzyme malt is very friable and easily ground to a flour. Enzyme malt, in addition to high levels of alpha-1,6-hydrolase, also possesses alpha-amylase and beta-amylase so that these useful enzymes are also present for hydrolytically converting starch and starch degradation products to sugars.

Because of the high level of alpha-1,6-hydrolase in enzyme malt it is capable of more completely hydrolyzing starch to its constituent sugars, glucose and maltose, than previously available malt. Enzyme malt, accordingly, can be added in a small amount to a brewer's wort to convert starch and/or non-sugar starch degradation products to yeast fermentable sugars to produce low calorie beer. Alpha-1,6-hydrolase attacks the alpha-1,6 branch point linkage of non-fermentable dextrin and other starch degradation products and converts them to fermentable sugars which yeast converts to alcohol, thereby reducing the carbohydrate content of the beer.

Enzyme malt is also highly useful in distilleries because of its ability to convert starch to higher yields of sugar which can be converted to alcohol.

Enzyme malt is also highly useful in the conversion of starch to maltose syrup since it gives maltose in high yields with a low concentration of glucose and limit dextrin or other starch by-product contaminants.

Enzyme Malt Production

The enzyme malt of this invention can be produced by unusual malting practice using standard equipment.

To produce enzyme malt it is important following steep-out to continue germination until the acrospire length, measured from the kernel base, is from at least 1¼ to 3 or more times the length of the kernel. This germination period may be for about 5 to 15 days, but generally will extend for about 8 to 11 days.

It is important during germination to maintain the barley well moisturized by watering it 2 to 3 times per day and by using well moisturized air during aeration of the barley. In general, it is best to have the moisture content of the malt continually increasing during germination. The germinating barley should be watered sufficiently to prevent the acrospire and rootlets from becoming dry. Increasing the moisture content of the malt, from that present at steep-out, about ½ to 2½% per day is desirable. The temperature during germination should be controlled and, while it may be kept in the range of normal malting practice, it is desirable to let the temperature rise near the end of germination. The first part, or first one-half, of the germination period is desirably effected at 55°–75° F., and the last 1–5 days of germination at 75°–90° F.

By operating to enhance acrospire and rootlet growth, the process proceeds contrary to conventional malting procedure which desires minimum rootlet production for maximum potential malt extract and minimum loss of carbohydrate by respiration of the kernels during germination. The traditional prior art objective is to germinate the barley until the acrospire is equal to the length of the kernel regardless of the germination time.

In addition to conducting germinating as described, it is generally beneficial to effect steeping of the barley under carefully controlled pH conditions. Specifically, the pH of the steep water during most or all of the steeping should be kept in the range of about pH 3.0 to 7.5, and advisably in the range of pH 4.0 to 6.0. Any suitable organic acid or inorganic acid may be used to obtain an acid pH. Inorganic acids which can be used are sulfuric acid, nitric acid, hydrochloric acid and phosphoric acid. Some organic acids which can be employed are acids such as acetic acid and lactic acid. Acid salts such as sodium or potassium acid sulphate, diacidphosphate and superphosphate may also be employed to make the steep water an acid pH. Preferably, the steep water is acidified using about 100–2000 ppm of sulfuric acid based on the barley weight.

Acidifying the steep water would be contraindicated by the prior art which teaches that acidulation lowers general enzymatic activity and may be used to retard germination and rootlet growth. See Luchsinger et al. U.S. Pat. No. 3,085,945.

Steeping is continued until the barley reaches the desired moisture level, which takes 1 to 3 days.

Gibberellic acid, previously used in malting, may be used in the process of this invention to stimulate enzyme production during malting. The gibberellic acid is most beneficially applied to the barley as it moves from the steep tanks to the germination compartments, although it can be added during steeping or germination or even during the early stage of kilning. About 0.05–5 ppm of gibberellic acid can be added. It is desirable to add it in the period from just prior to steep-out to close to the end of the germination period.

During the prolonged germination period employed in the process it may be desirable to apply an agent to the grain which will suppress microorganism growth which would otherwise be induced by the germinating conditions. About 1000 to about 4000 parts of sodium or potassium metabisulfite or sodium or potassium bisulfite per million parts of barley on a dry weight basis may be added to the steep water for this purpose. When added in water during germination about 100 to 1000 parts of the agent based on the barley weight is generally sufficient.

After the desired germination or growth has been reached, the green malt is usually dried carefully by kilning. Contrary to normal practice where the first stage of kilning is to remove moisture as fast possible, it has been found beneficial to remove the moisture slowly. The level of alpha-1,6-hydrolase has been found to rise during the first 10–24 hours of kilning. Therefore, drying of the malt is effected very slowly during the first 10–24 hours of kilning with the malt temperature being maintained so as to be not above 95° F., and desirably in the range of 75°–95° F. Thereafter, the malt temperature is increased until it is dried to a given moisture content not above 10%, usually 4–10%. The second stage of kilning appears to result in a lowering of alpha-1,6-hydrolase content. It is accordingly feasible to produce a partially kilned malt, i.e., one kilned about 12–24 hours or so, having a moisture content of 20–85%.

Sulfur dioxide gas may be passed through the malt during kilning for its traditional purposes, such as to brighten the malt, although this is not essential.

After kilning the malt can be stored, cleaned and milled if desired.

Assaying the enzyme malt for alpha-1,6-hydrolase must take into consideration the presence of alpha-amylase and beta-amylase in the malt. A suitable assay has been developed, however, which uses pullulan as the substrate. This assay makes use of the fact (E. Y. C. Lee and W. J. Whelan, Chapter 7, in *The Enzymes*, ed. Paul D. Boyer, Academic Press, 1971) that alpha-amylase and beta-amylase do not attack pullulan. However, alpha-1,6-hydrolase attacks the 1,6 branch points in pullulan, freeing a reducing sugar. The presence of the reducing sugars can be measured by reaction with 3,5-dinitrosalicyclic acid. Because all malts, and/or malt extracts, contain other reducing substances, a series of blank determinations must also be conducted and the alpha-1,6-hydrolase determined by difference. The analysis procedure may be illustrated as follows:

Exactly 5.0 g of finely ground malt is extracted with 200 ml of distilled water for three minutes in a blender and centrifuged. The supernatant liquid then serves as the enzyme extract. In each of four tubes are placed the following solutions:

|  | Tube 1 | Tube 2 | Tube 3 | Tube 4 |
| --- | --- | --- | --- | --- |
| Phosphate citrate buffer-pH 5 | 3 ml | 0 | 3 ml | 0 |
| 0.5% pullulan solution in pH 5 phosphate citrate buffer | 0 | 3 ml | 0 | 3 ml |
| Enzyme extract | 3 ml | 3 ml | 3 ml | 3 ml |

Tubes 1, 2 and 3 are blanks measuring the presence or formation of reducing substances in the malt from reactions other than alpha-1,6-hydrolase with pullulan. Tubes 1 and 2 are taken as 0 time and a portion is immediately removed and reacted with dinitrosalicyclic acid (DNSA) for reducing substances. Tube 1 gives a blank reaction for the reducing material present in the enzyme extract at the beginning of the assay. Tube 2 gives a blank for the initial reducing substances present in the enzyme extract and in the pullulan substrate. Tubes 3 and 4 are incubated for 60 minutes at 50° C. Then they too are reacted with dinitrosalicyclic acid. Tube 3 gives the increase in reducing groups during the 60 minutes due to the malt enzymes acting upon other material extracted from the malt. For example, there is soluble starch present which is attacked by the alpha and beta-amylases present to give reducing sugars. The increase in reducing sugars due to the action of alpha-1,6-hydrolase upon the pullulan substrate is calculated by the following formula:

Increase in reducing sugars =
(Tube 4 minus Tube 2) minus
(Tube 3 minus Tube 1)

The reaction of dinitrosalicyclic acid is calibrated in terms of mgs of maltose. A unit of alpha-1,6-hydrolase is defined as follows:

1 Unit of alpha-1,6-hydrolase = 1 mg maltose equivalent produced by 1 gm of a malt from a 0.5% pullulan substrate in 60 minutes at 50° C. and pH 5.0

Enzyme malt produced, with and without added gibberellic acid, according to the invention will have alpha-1,6-hydrolase values much higher than those of prior art malts of various types, including commercially available malts, as shown by the values reported in the following Table 1.

TABLE 1

| Malt | Germination Days | Acrospire Length in Terms of Kernel Length | Alpha-1,6-Hydrolase Units/gm | | Alpha Amylase-SKB Units[1] | Diastase-Degrees Lintner[1] |
| --- | --- | --- | --- | --- | --- | --- |
| | | | Kilned Malt | Green Malt | | |
| 1. Enzyme malt of the invention-no gibberellic acid | 10 | 3 | 98 | 120 | 100 | 300 |
| 2. Enzyme malt of the invention with gibberellic acid used. | 11 | 3 | 114 | — | 157 | 312 |
| 3. Enzyme malt without use of acid in steeping, without moisture increase during malting and without use of gibberellic acid. | 11 | 3 | 10 | — | 75 | 250 |
| 4. Brewer's malt-typical | 5 | 0.8-1.1 | 5 | 17 | 42 | 150 |
| 5. Distiller's malt-typical | 5 | 1-1.25 | 28 | 44 | 65 | 255 |
| 6. Distiller's malt made using gibberellic acid-typical | 5 | 1-1.25 | 48 | — | 86 | 273 |
| 7. Malt made with acidulation to prevent rootlet and acrospire growth-see U.S. Pat No. 3,085,945 | 5 | 0 | 5 | — | 41 | 150 |

[1]American Society of Brewing Chemists Method of Analysis (6th Edition, Pages 165-172)

The data in Table 1 shows not only that enzyme malt has high levels of alpha-1,6-hydrolase, but also that it has high levels of alpha-amylase and diastase. These high enzyme levels make enzyme malt economically useful. The data also shows that high alpha-amylase and high diastase levels do not necessarily mean simultaneously high alpha-1,6-hydrolase levels in malt.

Enzyme Malt in Beer Production

Enzyme malt provided by this invention is highly useful in producing beer, particularly low calorie beer. While it may be anticipated by those skilled in the art— *European Brewery Convention* (1975), pgs. 683-697— that a low calorie or light beer can be made by the additions of pullulanase and beta-amylase, it could not be anticipated that all of the required enzymes could be contained in a malt type of product. It is of advantage to use alpha-1,6-hydrolase which is from a natural food source rather than from a bacteria or fungus. Also, it is of advantage to have this natural enzyme system which contains an enzyme for which the alpha-1,6-dextrin is a preferred substrate as opposed to amyloglucosidase where the alpha-1,4 bond is the preferred substrate. Enzyme malt is most suitably used as an additive to a conventional wort produced in the usual way from regular malt and grains. Dextrins and other starch degradation products in the wort not hydrolyzed to fermentable sugars can be readily hydrolyzed to sugars by enzyme malt because of its high levels of alpha-1,6-hydrolase. The yeast then converts the sugars to alcohols thus reducing the carbohydrate and calorie content of the beer while raising the alcohol level. It is therefore possible to effect a savings in the total grain bill used in the beer production, whether regular beer or low calorie beer is brewed, because of the increased conversion to sugars obtained with enzyme malt.

The amount of enzyme malt added to the wort need not be large, and and can be as low as 1 lb. of enzyme malt per 1000 gallons of wort. After the enzyme malt and yeast are added to the wort it is fermented in the usual way to make beer, which is aged, finished and bottled.

By using enzyme malt in place of amyloglucosidase to prepare a beer of reduced dextrin content or low calorie beer, the yeast has maltose present in the wort to ferment instead of large amounts of glucose. As a result, yeast metabolism more closely follows that of a normal fermentation, giving an advantageous improvement in the flavor.

Enzyme Malt in Maltose Production

Enzyme malt provided by the invention is highly useful in the preparation of high maltose syrup from starch since it breaks the starch molecule into higher yields of maltose than regular malts, with low levels of glucose formation. High maltose syrups are valuable for many food uses because they exhibit a decreased tendency to crystallize, as compared to high dextrose corn syrups, and they tend to be nonhygroscopic making them useful in hard candies.

Representative of the starches which can be converted to high maltose syrups using enzyme malt are corn starch, potato starch, sweet potato starch, tapioca starch, milo, rice starch and wheat starch and the amylose and amylopectin fractions of starch.

While starch may be converted to maltose by enzyme malt, it is advisable for increased yields of maltose to first gelatinize the starch before the enzyme malt is added. Gelatinization may be effected by heating the starch to a temperature exceeding about 60° C. in water. Alpha-amylase from a cereal, fungal or bacterial source may be used to hydrolyze and thus liquefy the starch in water. If there is too much hydrolysis the yield of maltose will be reduced and if there is too little hydrolysis the gelatinized starch will be more solid than liquid causing production problems and loss of maltose yields.

After the gelatinized and liquefied starch is formed, the pH is adjusted to about 4.5–6.0 and ground enzyme malt is added. The starch is maintained at about 35° to 75° C., preferably 45°–70° C. From about 0.05 to 10 g of ground enzyme malt may be added per 100 g of initial starch. The mixture is kept, stirred or unstirred, for from about 4 to 96 hours, preferably for 6 to 72 hours, at which time from about 60 to 100% of the starch will be converted to maltose.

The maltose can be purified by centrifugation or filtration, or both, and further purified by treating with activated charcoal or ion exchange resins or both. The water can be vacuum evaporated to give a solids content of from 65–95%, preferably 80%. This results in a syrup of good biological stability.

It has been further found that the manganese ion, added to the gelatinized starch contemporaneously with the addition of the enzyme malt has an activating effect in increasing the yield of maltose. Only a small amount of the manganese ion in the form of a salt such as the chloride, sulphate or phosphate need be added and usually about 1000 to 8000 ppm of manganese ion based on the starch is sufficient. The calcium ion, which is beneficial for alpha-amylase enzyme, was found to have no beneficial effect.

The following examples are presented to further illustrate the invention.

EXAMPLE 1

5000 g of Larker barley was steeped in water containing 750 ppm of sulfuric acid to a moisture content of 41.5%. Following this the malt was germinated at 18°–25° C. (64°–77° F.). Beginning at the second day of germination the malt received watering twice a day of 500 ml each. Beginning at day 4, and each day thereafter, samples were removed and kilned at 120° F. for 24 hours to about 6% moisture. The alpha-1,6-hydrolase content of these malts are given below:

| Days Germination | Alpha-1,6-Hydrolase Units of Kilned Malt |
|---|---|
| 4 | 19 |
| 5 | 27 |
| 6 | 51 |
| 7 | 74 |
| 8 | 74 |
| 9 | 62 |
| 10 | 91 |
| 11 | 98 |
| 12 | 90 |
| 13 | 69 |

EXAMPLE 2

This example demonstrates the increase of alpha-1,6-hydrolase during the initial stages of kilning. 10 Kg of barley was steeped at pH 5.0 for 28 hours to 39.5% moisture and subsequently germinated at 60°–70° F. for 10 days. Then this green malt was kilned 23.5 hours using air at 110° F. Samples were periodically removed and analyzed for alpha-1,6-hydrolase. The values given are on a dry malt zero moisture basis.

| Time on Kiln (hrs) | Malt Temperature (°F.) | Alpha-1,6-hydrolase (units) |
|---|---|---|
| 0 | 65.0 | 78 |
| 1.5 | 89.8 | 89 |
| 3.5 | 99.9 | 83 |
| 5.5 | 104.4 | 94 |
| 10.0 | 108.0 | 73 |
| 17.5 | 108.5 | 69 |
| 23.5 | 108.5 | 72 |

EXAMPLE 3

250 g of barley (dry basis) was steeped at pH 5.0 to a moisture content of 40.4%. Then the sample was treated with 2 ppm of gibberellic acid. Following this, the malt was germinated at 17.8°–25° C. (64°–77° F.) for 12 days. Each day the malt was watered twice with from 15–20 ml of tap water. After the 12 days of germination the green malt was kilned using air at 120° F. for approximately 24 hours to a final moisture of 5.9%. Analysis of this malt gave 128 units of alpha-1,6-hydrolase, 156 units of alpha-amylase and 330 units of diastase activity. The alpha-amylase and diastase enzymes were measured by standard American Society of Brewing Chemists procedures.

In a similar experiment without the use of gibberellic acid a malt was obtained with 99 units of alpha-1,6-hydrolase.

EXAMPLE 4

This example illustrates the preparation of a low calorie or light beer by enzyme malt.

Three 2-liter worts were prepared by mashing 200 g of regular brewers malt and 1329 g of corn flakes. The wort was boiled and hop extract added. The wort ballings are given below. Then to each wort was added ground fully kilned enzyme malt having 90–95 alpha-1,6-hydrolase units per one gram, as listed:

1. Control—no enzyme malt
2. 1.0 g enzyme malt
3. 5.0 g enzyme malt

The brews were pitched with yeast and fermented. The carbonated and bottled beers were analyzed with the following results:

|  | 1 | 2 |  | 3 |
|---|---|---|---|---|
| Wort Balling P° | 11.33 | 11.57 |  | 11.33 |
| Beer Balling P° | 2.69 | 0.80 | less than | 0.00[A] |
| Beer Color L° | 1.26 | 1.22 |  | 1.21 |
| % Alcohol by Weight | 3.56 | 4.87 | more than | 4.19 |
| Calculated Original Gravity P° | 11.45 | 12.06 | more than | 10.35 |
| % Attenuation | 66.2 | 80.8 |  | 81.0 |

[A] The degrees plato (P°) scale does not go below 0. Zero degrees plato was chosen equal to the specific gravity of water, which is 1.

The following examples illustrate the use of fully kilned enzyme malt (about 4% moisture and having 90–95 units of alpha-1,6-hydrolase units per one gram) in maltose production. The procedure for substrate production, and subsequent enzyme modification of said substrate, was essentially as follows unless otherwise stated:

Samples of commercial corn starch were added to distilled water in approximately a 1:1 ratio (w/w) on a dry starch basis, and mixed into a slurry. The slurry was then neutralized to a pH of approximately 6.9 using dilute sodium hydroxide. To this neutralized slurry a varying amount of a commercial fungal alpha-amylase was added (amount depending upon desired final product and activity of alpha-amylase used) and thoroughly mixed by gentle stirring.

The slurry was then added to an approximately equal volume of distilled water held at approximately 85° C. with vigorous stirring action. The addition rate was such that the gelatinized starch remained in a mobile liquid form throughout the process. Upon completion of the slurry addition, the temperature of the total mixture was raised to a temperature sufficient to inactivate any enzyme activity that was present and to further aid in the gelatinization of residual starch granules. The mixture was then cooled to an ambient temperature and used as a source of enzyme substrate subject to modification (pH, temperature, dissolved solids, etc.) to obtain a desired set of conditions.

To the modified substrate, varying enzyme preparations and systems were added and mixed with gentle stirring and incubated under various conditions and time periods.

The resulting syrups were then centrifuged at approximately 1000 times gravity for 1 hour. Then they were filtered through cheesecloth followed by fluted filter paper at room temperature. The filtration was allowed to proceed for three hours with the unfiltered residue being discarded and the filtered syrup volumetrically measured. The syrup was then brought to a sufficient temperature to inactivate any enzymes that might be present.

The filtered syrup was then analyzed for maltose by the dinitrosalycylic acid method for reducing sugars. The conversion of the starch substrate to reducing sugars as maltose (hereinafter referred to as maltose conversion or simply conversion) could then be calculated. Percent glucose was obtained by the glucose oxidase/peroxidase colorimetric method.

EXAMPLE 5

Effect of Enzyme Malt on the Modified Starch Substrate 1.0 g of finely ground enzyme malt per 200 ml of substrate
Incubation time of 21 hours
Incubation temperature of 55° C.
Incubation pH of 5.0
Dissolved Solids of 32.7%
Dextrose Equivalents of 15.4

|  | Maltose Conversion |
|---|---|
| Enzyme Malt 1 | 75.1% |
| Enzyme Malt 2 | 76.5% |
| Enzyme Malt 3 | 81.2% |
| Enzyme Malt 4 | 81.5% |
| Enzyme Malt 5 | 84.8% |
| Enzyme Malt 6 | 87.6% |

EXAMPLE 6

Effect of Dissolved Solids in Modified Starch Substrate on Maltose Conversion Using 2 g of Finely Ground Enzyme Malt/200 ml Substrate Incubation time of 21 hours
Incubation temperature of 51° C.
Incubation pH of 5.0

| Dissolved Solids | Maltose Conversion | Glucose |
|---|---|---|
| 31.8% | 76.9% | 1.4% |
| 25.0% | 87.5% | 1.2% |
| 20.0% | 87.8% | 1.0% |
| 15.0% | 90.2% | 0.8% |

EXAMPLE 7

Effect of pH on Enzyme Malt Activity 2.0 g of finely ground enzyme malt/200 ml substrate
Incubation time of 17.5 hours
Incubation temperature of 55° C.
Dissolved solids in modified starch substrate of 40%
Dextrose equivalents of 23.8

| pH | Maltose Conversion |
|---|---|
| 4.5 | 63.8% |
| 5.0 | 69.7% |
| 5.5 | 64.5% |
| 6.0 | 49.3% |
| 6.5 | 29.0% |
| 7.0 | 24.9% |

EXAMPLE 8

Effect of Incubation Time on Maltose Conversion 1.0 g of finely ground enzyme malt/200 ml substrate
Incubation temperature of 55° C.
Incubation pH of 5.0
Dissolved solids in modified starch substrate of 33%
Dextrose equivalents of 18.0

| Incubation Time-Hours | Maltose Conversion |
|---|---|
| 6 | 71.6% |
| 10 | 72.2% |
| 19 | 73.1% |
| 24 | 75.2% |
| 30 | 82.7% |
| 43 | 77.8% |
| 50 | 74.5% |
| 72 | 65.9% |

EXAMPLE 9

Effect of Temperature on Enzyme Malt Activity 1.0 g of finely ground enzyme malt/200 ml substrate
Incubation time of 22.0 hours
Incubation pH of 4.7
Dissolved solids in modified starch substrate of 34.0%
Dextrose equivalent of 13.0

| Incubation Temperature | Maltose Conversion |
| --- | --- |
| 55° C. | 65.7% |
| 60° C. | 67.6% |
| 65° C. | 67.8% |

EXAMPLE 10

Effect of Metal Ions on Conversion 1.0 g of finely ground enzyme malt/200 ml substrate
Incubation time of 24.0 hours
Incubation temperature of 55° C.
Incubation pH of 50° C.
Dissolved solids in modified starch substrate of 32.9%
Dextrose equivalent of 11.4
Ions at 0.1 molar concentration based on water

| Ion | Maltose Conversion |
| --- | --- |
| Zinc | 24.0% |
| Magnesium | 62.7% |
| Manganese | 90.0% |
| Sodium | 59.4% |
| Copper | 0.0% |
| Potassium | 63.7% |
| Control | 71.6% |

EXAMPLE 11

Effect of Enzyme Malt Quantity on Conversion

Incubation time of 48 hours
Incubation temperature of 55° C.
Incubation pH of 5.0
Dissolved solids in modified starch substrate of 25%
120 g of substrate used for each experiment
Dextrose equivalent of 20.0

| Enzyme Malt Units | Maltose Conversion |
| --- | --- |
| 100 | 77.8% |
| 150 | 79.4% |
| 200 | 76.9% |
| 250 | 79.3% |
| 300 | 81.8% |
| 350 | 81.8% |
| 400 | 79.1% |
| 450 | 77.8% |
| 500 | 67.5% |
| 550 | 65.7% |

This detailed description has been given for clearness of understanding only, and no unnecessary limitations will be understood therefrom, as modifications will be obvious to those skilled in the art.

What is claimed is:

1. A dried malt having an average acrospire length of at least three times the average length of the kernels and containing at least 55 units of alpha-1,6-hydrolase activity per one gram of dried malt.

2. A green malt in which the acrospire length is at least three times the average length of the kernels and containing at least 75 units of alpha-1,6-hydrolase activity per one gram of malt.

3. A process which comprises:
    steeping barley in water at pH 3 to 7.5;
    germinating the steeped barley until the average acrospire reaches a length of at least three times the average length of the barley kernels to produce green malt; and
    drying the green malt thereby producing malt having at least 55 units of alpha-1,6-hydrolase activity per one gram of malt.

4. A process which comprises:
    adding a small amount of a malt containing at least 55 units of alpha-1,6-hydrolase activity per one gram of malt to an aqueous starch substrate containing a 0.1 molar concentration of manganese based on the water in the starch substrate, and
    maintaining the mixture at a temperature of about 35° to 75° C. for about 4 to 96 hours to produce a maltose syrup.

* * * * *